(12) United States Patent
Stroia et al.

(10) Patent No.: US 7,587,890 B2
(45) Date of Patent: Sep. 15, 2009

(54) REDUCTANT INJECTION RATE SHAPING METHOD FOR REGENERATION OF AFTERTREATMENT SYSTEMS

(75) Inventors: Bradlee Stroia, Columbus, IN (US); Michael Cunningham, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 11/507,130

(22) Filed: Aug. 21, 2006

(65) Prior Publication Data

US 2008/0028751 A1 Feb. 7, 2008

(51) Int. Cl.
*F01N 3/00* (2006.01)
(52) U.S. Cl. .............................. 60/286; 60/274; 60/280; 60/287; 60/292; 60/295; 60/297; 60/301
(58) Field of Classification Search .................... 60/274, 60/278, 280, 286, 287, 288, 292, 295, 297, 60/301, 303
See application file for complete search history.

(56) References Cited

U.S. PATENT DOCUMENTS

| | | | |
|---|---|---|---|
| 5,201,802 A | 4/1993 | Hirota et al. | |
| 5,406,790 A * | 4/1995 | Hirota et al. | 60/276 |
| 5,524,432 A | 6/1996 | Hansel | |
| 6,105,365 A * | 8/2000 | Deeba et al. | 60/274 |
| 6,125,629 A * | 10/2000 | Patchett | 60/286 |
| 6,167,698 B1 | 1/2001 | King et al. | |
| 6,176,078 B1 | 1/2001 | Balko et al. | |
| 6,182,444 B1 | 2/2001 | Fulton et al. | |
| 6,199,372 B1 | 3/2001 | Wakamoto | |
| 6,199,375 B1 | 3/2001 | Russell | |
| 6,606,979 B2 | 8/2003 | Kimura | |
| 6,813,882 B2 * | 11/2004 | Hepburn et al. | 60/286 |
| 6,959,542 B2 * | 11/2005 | Taylor et al. | 60/295 |
| 6,996,975 B2 * | 2/2006 | Radhamohan et al. | 60/286 |
| 7,213,395 B2 * | 5/2007 | Hu et al. | 60/286 |
| 2004/0037755 A1 | 2/2004 | Mital et al. | |
| 2004/0050037 A1 | 3/2004 | Betta et al. | |

* cited by examiner

*Primary Examiner*—Binh Q. Tran
(74) *Attorney, Agent, or Firm*—Krieg DeVault LLP; J. Bruce Schelkopf, Esq.

(57) ABSTRACT

The invention provides methods for regenerating pollutant storage and catalytic components of an internal combustion engine's exhaust gas aftertreatment system. These methods include introducing reductant in to catalytic components requiring regeneration in series of discreet portions during a Scheduled Regeneration Event. Typically the flow of exhaust gas to the catalytic component undergoing regeneration is at least partially reduced.

13 Claims, 4 Drawing Sheets where: Time ∅ = Scheduled regeneration event

DB = Delay time for bypass valve open

OB = Open duration for bypass valve

D1 = Delay time for injection #1

O1 = Injection duration for injection #1

D2 = Delay time for injection #2

O2 = Injection duration for injection #2

D3 = Delay time for injection #3

O3 = Injection duration for injection #3

REDUCTANT INJECTION RATE SHAPING METHOD FOR REGENERATION OF AFTERTREATMENT SYSTEMS

TECHNICAL FIELD OF THE INVENTION

The present invention generally relates to internal combustion engines and more particularly to methods for regenerating catalytic components of exhaust gas aftertreatment systems used to treat the exhaust of internal combustion engines.

BACKGROUND OF THE INVENTION

Environmental concerns have resulted in increasingly strict regulation of engine emissions by governmental agencies. For example, reduction of nitrogen-oxygen compounds (NOx) in exhaust emissions from internal combustion engines has become increasingly important and current indications are that this trend will continue.

Future emission levels of diesel engines will have to be reduced in order to meet Environmental Protection Agency (EPA) regulated levels. In the past, the emission levels of US diesel engines have been regulated according to the EPA using the Federal Test Procedure (FTP) cycle, with a subset of more restrictive emission standards for California via the California Air Resources Board (CARB). Proposed Tier II emission standards, are 50% lower than current Tier I standards. Car and light truck emissions are measured over the FTP 75 test and expressed in gm/mi.

Regulatory agencies continue to propose and apply stricter emission standards. For example, proposed Ultra-Low Emissions Vehicle (ULEV) emission levels for light-duty vehicles up to model year 2004 are 0.2 gm/mi. NOx and 0.08 gm/mi. particulate matter (PM). Beginning with the 2004 model year, all light-duty Low Emission Vehicles (LEVs) and Ultra-Low Emission Vehicles (ULEVs) in California have to meet a 0.05 gm/mi. NOx standard to be phased in over a three year period. In addition to the NOx standard, a full useful life PM standard of 0.01 gm/mi. also have to be met. The EPA has also proposed tighter regulations for off-road diesel engines, requiring them to emit 90% less particulate matter and nitrogen oxides, by 2014 than they do today.

Traditional methods of in-cylinder emission reduction techniques such as exhaust gas recirculation (EGR) and injection rate shaping, by themselves will not be able to achieve these low emission levels required by the standard. Aftertreatment technologies will have to be used, and will have to be further developed in order to meet the future low emission requirements of the diesel engine.

Some promising aftertreatment technologies designed to meet future NOx emission standards include lean NOx catalysts, Selective Catalytic Reduction (SCR) catalysts, and Plasma Assisted Catalytic Reduction (PACR). Current lean NOx catalyst technologies can reduce engine out NOx emissions in the range of 10 to 30 percent under typical operating conditions. One limitation that these technologies share is that catalytic surfaces within each device require periodic regeneration in order for the devices to continue to function properly. And regeneration usually involves supply a source of reductants, for example, urea or diesel fuel.

The use of urea has limitations. Using urea to regenerate catalysts requires a system for the storage and supply of urea in ready proximity to the engine. This requirement is especially limiting when the engine is used in transportation. Under these circumstances a network of urea supplies must be available to replenish the vehicle's onboard urea stocks as they are depleted.

The use of diesel fuel to regenerate aftertreatment system catalyses is also problematic. For example these systems often involve a significant fuel penalty, as a portion of the engine's fuel supply must be diverted to the aftertreatment system when aftertreatment catalysis regeneration is required. If the fuel is delivered during periods of high exhaust output a large portion of fuel must be introduced into the system to create exhaust gas rich in hydrocarbon.

Another complication is that there are only a finite number or reaction sites on the surface of any catalyst. Once all of these reaction sites are occupied excess reactants will not associate with the catalyst and will not react. This is especially problematic when one or more of the reactants flow across the surface of the catalyst. For example, depending upon parameters such as exhaust pipe diameter, exhaust gas flow rate, catalyst surface area and the amount of reductant in the exhaust gas, a significant amount of the reductant in the rich exhaust gas may pass over the catalyst surface un-reacted. In addition to contributing to the fuel penalty associated with regenerating the catalyst, any amount of hydrocarbon fuel that is vented to the atmosphere is itself a pollutant.

Therefore, there is a need for an engine aftertreatment system that provides a ready source of reductants to regenerate exhaust aftertreatment system components and that does not result in a significant fuel penalty or the release of un-reacted reductant into the atmosphere. Some aspects of the present invention are directed toward addressing this need.

SUMMARY OF THE INVENTION

One aspect provides a method of regenerating catalytic components of an internal combustion engine exhaust gas aftertreatment system. In one embodiment, reductant is introduced into the exhaust gas aftertreatment system to at least partially regenerate catalytic components of the aftertreatment system. The total amount of reductant introduced into the system during one regeneration cycle is divided into portions. Each portion is introduced into the exhaust gas aftertreatment system in a discrete event. There is a pause of between about 0.5 and about 10 seconds between the introduction of each portion of reductant during a typical regeneration event. Typically the flow of exhaust gas to the catalytic component undergoing regeneration is reduced while the reductant is being introduced into the component.

In one embodiment the total amount of reductant introduced into the system during the course of a single regeneration cycle is divided into at least two portions.

In one embodiment the total amount of reductant introduced into the system during the course of a single regeneration cycle is divided into three portions.

In one embodiment the total amount of reductant introduced into the system during the course of a single regeneration cycle is divided into four portions.

In one embodiment the total amount of reductant introduced into the system during the course of a single regeneration cycle is divided into five portions.

In one embodiment the exhaust gas aftertreatment system catalytic components that can be regenerated using this method include for example, Nitric Oxide (NOx) adsorbers, Selective Catalytic Reductant (SCR) catalysts, Catalytic Soot Filters (CSFs) and the like.

In one embodiment portions of reductant are introduced directly into the aftertreatment system by virtue of a dedicated reductant injection system. The number of portions introduced and the timing of their introduction are calibrated so as to reduce the amount of reductant required to regenerate a given catalytic component of the aftertreatment system, thus increasing the efficiency of the regeneration process.

In another embodiment the combination of reduced exhaust gas flow and the time spaced introduction of reductant portions creates rich conditions (lambda values in excess of 1) that promote efficient regeneration of the catalytic components while minimizing the amount of unreacted reductant passing through the regenerating catalytic component.

In one embodiment the aftertreatment system is operated under a closed control system. Under closed control, data collected by sensors that monitor parameters related to aftertreatment system performance are transmitted to a controller. Based on the data input, and present or programmed set points, the controller activates various components of the exhaust gas aftertreatment system to effect at least a partial regeneration of at least one catalytic component of the exhaust gas aftertreatment system. For example, in one embodiment the controller actuates an exhaust gas flow valve to shunt exhaust gas flow away from the catalytic component(s) undergoing regeneration. In one embodiment, when the flow of exhaust gas to the component is reduced, the controller activates an injector that delivers reductant into the catalytic components of the exhaust gas aftertreatment system.

In one embodiment the aftertreatment system operates in an open control system. In an open control system the controller activates and inactivates the exhaust gas aftertreatment component regeneration system based upon stored engine run parameters such as time, fuel usage, engine speed, and the like. Data from sensors, for example, the level of NOx in exhaust gas from the outlet of NOx adsorber supplied by optional NOx sensors, are not necessary for the control of various components of the exhaust gas aftertreatment system.

DETAIL DESCRIPTION OF THE PREFERRED EMBODIMENTS

Figure 1:
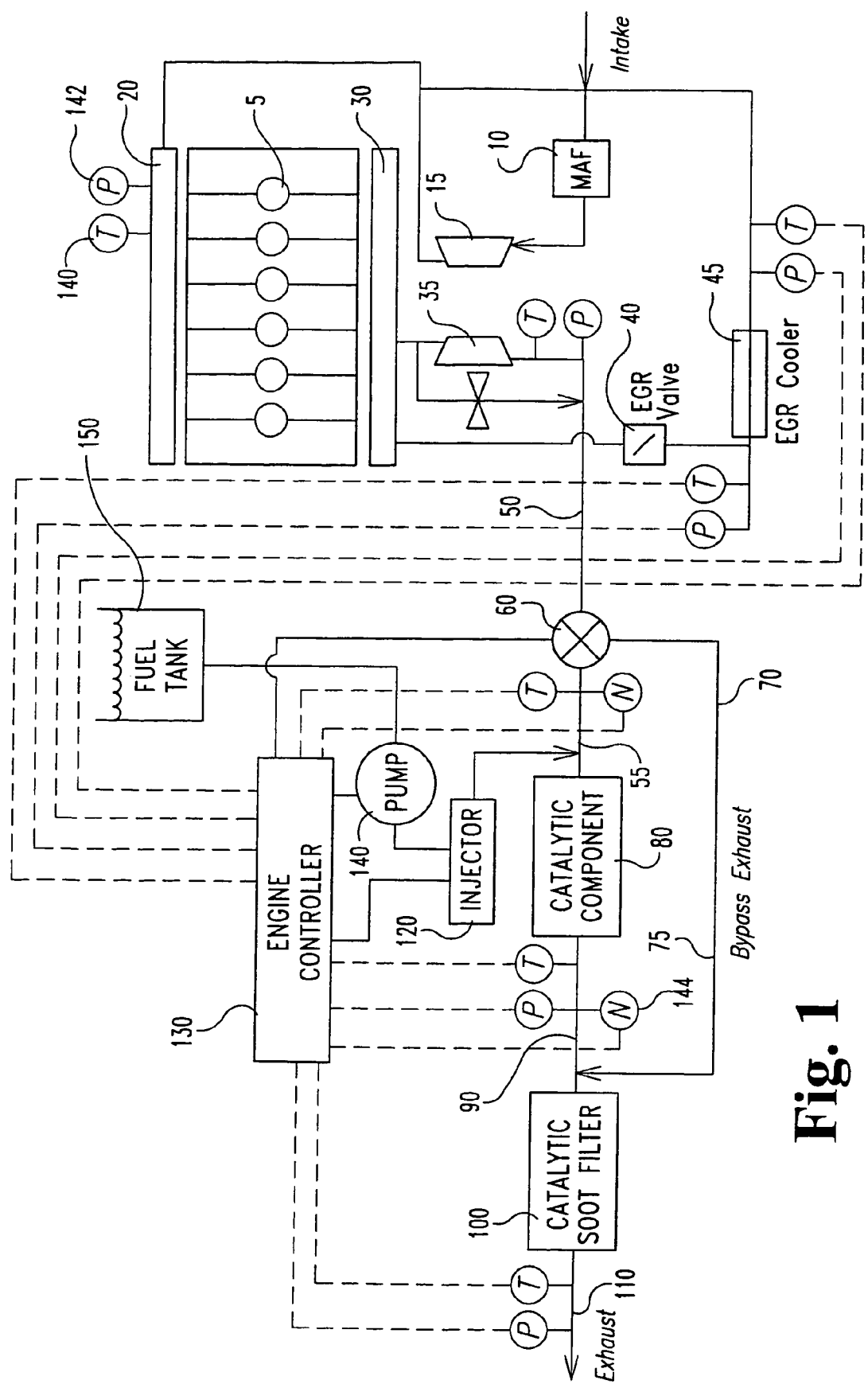
FIG. 1 is a schematic block diagram of one embodiment, a system used to regenerate components of an exhaust gas aftertreatment system used to treat exhaust gases produced by an internal combustion engine.

For the purposes of promoting an understanding of the principles of the invention, reference will now be made to the embodiment illustrated in the drawings and specific language will be used to describe the same. It will nevertheless be understood that no limitation of the scope of the invention is thereby intended. And that alterations and modifications in the illustrated device, and further applications of the principles of the invention as illustrated therein are herein contemplated as would normally occur to one skilled in the art to which the invention relates.

NOx adsorber catalysts have the potential to greatly reduce NOx emissions from internal combustion engines. Under some operating conditions NOx adsorber catalysts can reduce the level of NOxs emitted from an internal combustion engine by as much as 60-90%. Clearly then, NOx adsorbers are one of the most promising NOx reduction technologies.

NOx adsorbers operate by sequestering nitrogen oxides, often under lean engine operating conditions. Many of these NOx adsorbers can be regenerated by converting under rich NOx to $N_2$ under rich conditions which is then vented into the atmosphere. Some commonly used NOx adsorbers include a precious metal catalyst such as platinum, rhodium, and at least an NOx trap, for example, an alkali metal such as potassium, sodium, lithium, and cesium. Other NOx traps may include alkali-earth metals such as barium and calcium and rare earth metals such as lanthanum and yttrium. During lean-burn operation of an internal combustion engine, the NOx adsorber traps nitrogen oxide in the form of stable nitrates. Later, often when the flow of exhaust gas is reduced, a reductant is introduced into the component. The reductant and the stored form of NOx react on the surface of the precious metal catalyst to convert NOx into Nitrogen and releasing it into the atmosphere.

A typical NOx adsorber that can be used to practice the invention is comprised of platinum (a precious metal catalyst) and barium oxide (a NOx adsorber). Briefly then, by way of explanation and not limitation, under lean conditions (when the concentration of $O_2$ in the exhaust gas is relatively high) oxygen is deposited on the platinum surface in the form of $O_2^-$ or $O_2$. Oxygen on the surface of platinum reacts with NO in the exhaust gas by the following reaction: $2NO + O_2 \rightarrow 2NO_2$. However formed, $NO_2$ is further oxidized on the platinum surface to form $NO_3$ (nitric acid ions). In turn, nitric acid ions bind to the barium oxide component of the NOx adsorber to form, for example, $BaNO_3$. The net result is that volatile NOxs are removed from the engine exhaust before they are released into the atmosphere.

Under rich (stoichiometric conditions), when the concentration of oxygen in the exhaust gas is relatively low, the reaction to form nitric acid ions ($NO_3 \rightarrow NO_2$) is reversed and NOx in the form of $NO_2$ is released from the absorbent. In the presence of precious metal catalyst such as platinum, $NO_2$ may react with reductants such as CO and HC to form $N_2$. Similarly, albeit often under harsher conditions, SOx may also react with reductants under rich conditions to form elemental sulfur.

One complication of the process is that sulfur and sulfur containing molecules in the exhaust gas also react with precious metal catalysts such as platinum to form sulfur oxides, and sulfur oxides can also form complexes with absorbents such as barium oxide. Sulfur complexes formed between metal catalysts, including precious metal catalysts and NOx absorbents, are generally more thermodynamically stable than similar complexes formed with NOx. Accordingly, sulfurous compounds in the exhaust may poison precious metal catalysts; and they may not be as readily released from NOx adsorbers as are NOxs.

In general the reduction of NOx or SOx compounds by reductants such as hydrocarbons to carbon dioxide, elemental nitrogen or sulfur, catalyzed by precious metals such as platinum, proceeds more efficiently as the temperature on the surface of the catalyst is increased. However, widely used NOx adsorbers such as barium oxide (BaO) operate less efficiently at elevated temperatures, for example $Ba(NO_3)_2$ is more stable at 200° C. than at 500° C. Therefore, if exhaust temperatures are too high under lean conditions, the adsorber may fail to efficiently sequester NOx, and if the reaction temperatures are too low, even under rich conditions, the regeneration of the adsorber may be inefficient.

One approach to optimizing both adsorber binding of nitrogen oxides and the regeneration of NOx adsorbers to release essentially $N_2$ is to periodically introduce excess hydrocarbons into the engine in the form of excess engine fuel. The introduction of fuel into the engine produces rich exhaust gases, that provides a source of reductants such as HC and CO for the regeneration of the NOx adsorber, while some of the fuel burns in the adsorber, creating excess heat. One device useful for the introduction of reductant is a reductant injector. In one embodiment a reductant injector has an injector inlet and an injector outlet.

The injector inlet is operatively coupled to a reductant pump outlet. An injector output is operatively coupled to a catalytic component of the exhaust gas aftertreatment system. The reductant pump has a reductant pump inlet operatively coupled to the engine's fuel tank with an output operatively coupled to the reductant injector. One embodiment of this system is designed to reduce the fuel penalty associated with regenerating components of the aftertreatment system. Under certain points in the duty cycle, the engine exhaust gas is voluminous. If reductants are introduced during periods of high exhaust gas flow a large amount of reductant may be required to create rich conditions. As only a relatively small amount of hydrocarbon is actually necessary to regenerate the NOx adsorber the introduction of reductants into the NOx adsorber can be timed so that reductant is introduced when exhaust gas flow is reduced.

In order to further reduce the fuel penalty associated with regenerating an exhaust gas aftertreatment component, the system may be outfitted with a controller to regulate the timing and amount of reductant introduced into the exhaust gas aftertreatment system. For example, an engine controller can be operatively linked to the injector and reductant pump, such that the controller regulates the exhaust gas valve system, reductant injector, and pump, adding reductant to the aftertreatment system during periods of reduced exhaust gas volume. At times of reduced exhaust gas flow only relatively small amounts of reductant are required to create rich conditions in the component undergoing regeneration.

Another embodiment is an internal engine exhaust gas aftertreatment system comprising a valve system having a valve system input operatively coupled to the exhaust gas outlet of an internal combustion engine. In this embodiment the valve system includes a first exhaust gas control value. The first exhaust gas control valve has a first exhaust gas valve inlet and outlet. The first exhaust gas inlet is operatively linked to a source of internal combustion engine exhaust gas. The outlet of the first exhaust gas control valve is operatively linked to the inlet of a first regeneratable catalytic component. The system further includes a second exhaust gas control valve. The second exhaust gas control valve has a second exhaust gas valve inlet and outlet. The inlet of the second valve is operatively linked to a source of internal engine exhaust. And the outlet of the second exhaust gas control valve is operatively linked to an exhaust gas bypass pipe. In still another embodiment the outlet of the second exhaust gas outlet is operatively linked to the inlet of a second catalytic component. The aftertreatment system includes at least one source of reductant operatively linked to at least one catalytic component and under the regulation of the exhaust gas controller. When a given catalytic component is undergoing at least partial regeneration, the controller shunts at least a portion of exhaust flow away from the component undergoing regeneration, thereby reducing the volume of exhaust gas entering the component. At the same time, the controller activates the reductant delivery system to deliver a series of aliquots of reductant to the component undergoing regeneration. The result is a rich exhaust gas that is delivered to the catalytic component and incurs a relatively small fuel penalty.

In another aspect, the exhaust gas aftertreatment system includes sensors that collect data on parameters such as engine performance, exhaust gas temperature and the composition of the engine exhaust gas. Data from these sensors can be relayed to the system controller and processed to determine if catalytic components in the system need to be regenerated. In this system the various components of the aftertreatment system under the regulation of the controller may be actuated in response to data input from the sensors and set values pre-programmed into the controller.

Still another embodiment provides methods for treating engine exhaust comprising the steps of providing an exhaust aftertreatment system including an exhaust gas valve regulating system. The exhaust gas valve regulating system may include a first exhaust gas valve and a second exhaust gas valve and at least two catalytic components, for example, two NOx adsorbers arranged in parallel such that each NOx adsorber constitutes one leg of the system. The exhaust gas inlet of each leg of the system may be operatively coupled to the outlet of one side of the exhaust gas valve regulating system.

In one embodiment the aftertreatment system includes at least two exhaust gas aftertreatment components designed to operate in parallel. Exhaust gas treatment components are linked to one another and to the source of internal combustion engine exhaust gas by a system of valves. The exhaust gas valve system is designed such that the amount of exhaust gas delivered to each leg can be at least partially regulated.

Each leg of the system may also be is supplied with a means for delivering reductant to each leg of the exhaust gas system. For example, each leg of the system can include a reductant injector having a reductant injector inlet operatively linked to the outlet of a reductant pump having a reductant pump inlet operatively coupled to the engine's fuel tank outlet. A controller, for example an engine controller, adjusts the valve system to decrease the flow of exhaust gas to the leg having the component in need of regeneration. At the same time the controller activates the reductant pump and the reductant injector operatively coupled to exhaust gas in the leg having a component in need of regeneration. The total amount of reductant delivered directly the leg undergoing regeneration during a given duty cycle is divided into substantially equal aliquots. After each aliquot is delivered there is a finite pause, during this pause the controller deactivates either the reductant pump and or the injector to insure that no reductant is directly introduced into the component.

In another embodiment a single means for delivering reductant may be provided. In one version of this embodiment reductant is introduced into one site upstream of both legs and positioned such that reductant is introduced when exhaust gas flow is reduced to a specific leg undergoing regeneration.

In one embodiment reductant is introduced into the system in a series of discreet events each followed by a period of time in which no additional reductant is delivered directly into the aftertreatment system. Introducing reductant in a series of discreet steps creates rich exhaust gas while minimizing the amount of reductant that may pass through the catalytic component without reacting. This approach reduces the fuel penalty associated with regenerating components of the aftertreatment system.

In one embodiment, the valve system used in the exhaust aftertreatment system may be either a proportional 3-way valve or a pair of 2-way valves. The valves may be of a kind that open and close by discrete amounts or valves that have continuously variable outputs.

In one embodiment, the aftertreatment systems may include temperature, lambda sensors and/or NOx sensor(s). These sensors may collect and relay data such as engine run parameters and/or the condition of the exhaust gas to a controller that regulates various components of the system including, for example, the exhaust valve system, the reductant fuel pump, and reductant injectors.

In another embodiment, the aftertreatment system includes a carbon soot filter for the removal of soot particles from internal combustion engine exhaust.

In still another aspect, the aftertreatment system includes a Catalytic Soot Filter (CFS) for the removal of soot particles from internal combustion engine exhaust. In addition to entrapping soot particles, a CSF includes at least one catalytic component that can be used to regenerate the device by removing soot particle entrapped in the filter in the form of, for example, carbon dioxide.

One embodiment is an exhaust aftertreatment system comprising at least one NOx adsorber for sequestering NOx produced by internal combustion engines. This system may further include a system for directing engine exhaust gas to and away from the NOx adsorber, a dedicated fuel supply for supplying fuel to the NOx adsorber, a means of timing the addition of the fuel to the NOx adsorber when exhaust gas flow to the NOx is reduced and components for the reduction of SOx, soot, and volatile hydrocarbons. Various components of the aftertreatment system can be activated as is necessary or desirous to remove pollutants from internal engine exhaust gas and to regenerate various components of the aftertreatment system.

Referring now to FIG. 1, there is illustrated a schematic block diagram of one embodiment, an internal combustion engine exhaust gas aftertreatment system. The system may be used to remove particulates and various chemical compounds from exhaust gas created by internal combustion engine 5. The system includes mass air flow sensor 10 having an inlet vented to the atmosphere and an outlet operatively coupled to the inlet of intake manifold 20. Intake manifold 20 has an intake manifold 20 outlet operatively coupled to the compression chamber of engine 5. Exhaust gas produced by internal combustion engine 5 is operatively vented to exhaust manifold 30. In one embodiment exhaust manifold 30 has an exhaust manifold 30 outlet operatively connected to optional Engine Gas Re-circulation (EGR) valve 40. EGR valve 40 has an ERG valve 40 outlet operatively linked to ERG cooler 45. ERG cooler 45 has an ERG cooler 45 outlet operatively linked to the inlet of intake manifold 20. EGR valve 40 is operatively linked to engine controller 130. Controller 130 regulates the portion of engine exhaust gas shunted through EGR valve 40 by adjusting either the length of time EGR valve 40 is open or by adjusting the degree to which the orifice of ERG valve 40 is open, or both.

A portion of the exhaust exiting exhaust manifold 30 may optionally by used to drive a turbocharger turbine 35, which in turn drives a turbocharger compressor 15. Rotation of the compressor 15 acts to compress engine intake air before it is delivered to the intake manifold 20.

At least a portion of engine exhaust gases produced by internal combustion engine 5 are output through exhaust manifold 30 to the inlet of exhaust gas aftertreatment system valve 60. Exhaust gas aftertreatment system valve 60 has an exhaust gas valve 60 inlet, an exhaust gas valve 60 first outlet, and an exhaust gas valve 60 second outlet. The first outlet of exhaust gas 60 is operatively linked to the inlet of catalytic component 80. Catalytic component 80 has a catalytic component 80 inlet and a catalytic component 80 outlet. In one embodiment (not shown) the outlet of catalytic component 80 is vented to the atmosphere. In another embodiment the outlet of catalytic component 80 is operatively linked to the inlet of Catalytic Soot Filter (CSF) 100. CSF 100 also has a CSF 100 outlet, which may be operatively vented to the atmosphere.

The second outlet of exhaust gas valve 60 is operatively linked to exhaust gas bypass 70. Exhaust gas bypass 70 also has an exhaust gas bypass outlet operatively linked to the inlet of CSF 100.

Figure 2:
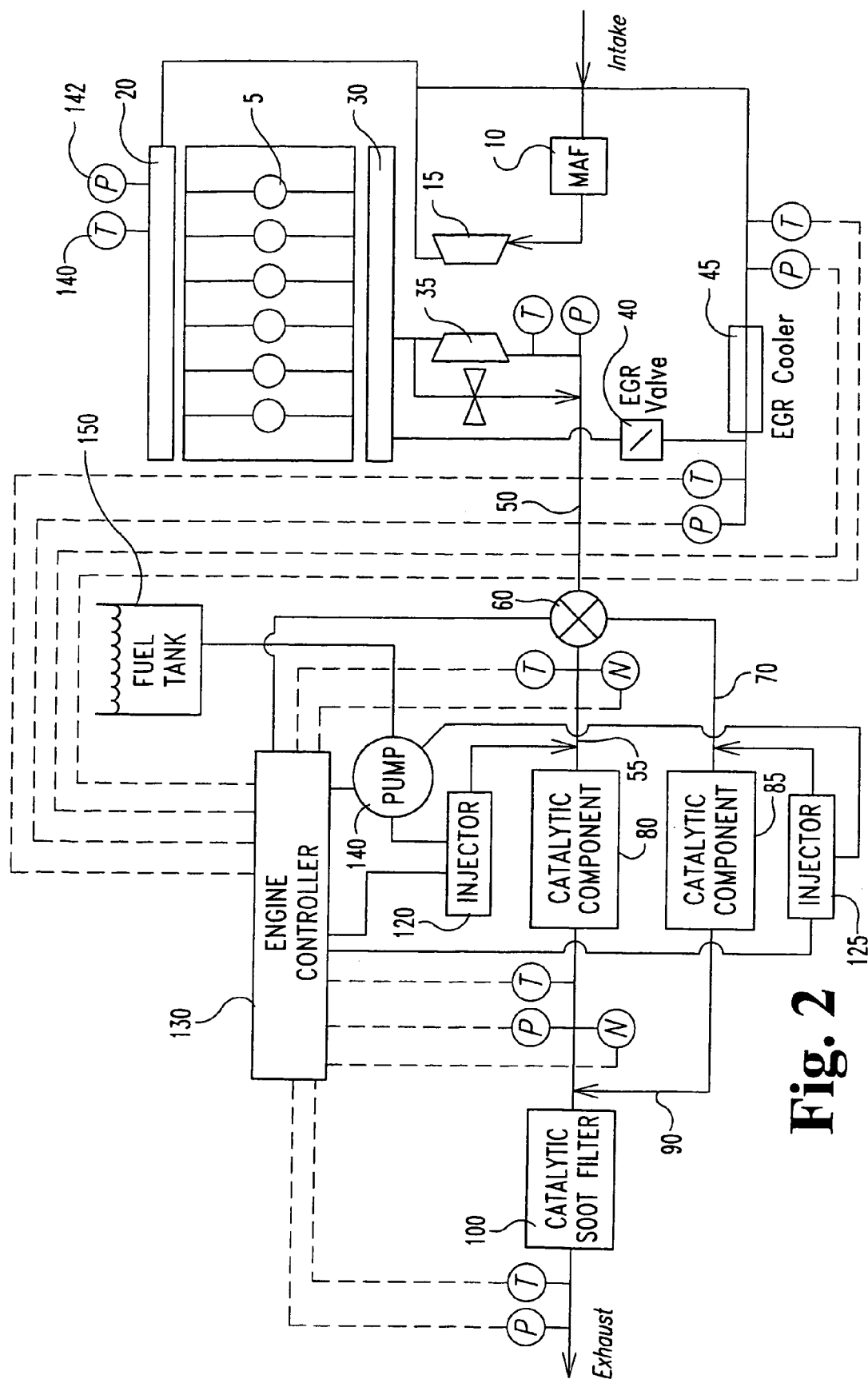
FIG. 2 is a schematic block diagram of one embodiment, a system used to regenerate components of an exhaust gas aftertreatment system used to treat exhaust gases produced by an internal combustion engine.

Referring now to FIG. 2, in one embodiment the outlet of exhaust gas bypass 70 is operatively linked to the inlet of a second catalytic component 85. In addition to an inlet second catalytic component 85 has a second catalytic component 85 outlet operatively linked to the inlet of CSF 100.

Referring again to FIG. 1, in one embodiment the exhaust gas aftertreatment system has a system for introducing reductant (for example, diesel fuel) into catalytic component 80. As illustrated in FIG. 1, this system may be comprised of a reductant reservoir, for example fuel tank 150 having a fuel tank 150 outlet operatively linked to a reductant pump 140. Reductant pump 140 has a reductant pump 140 outlet operatively linked to the inlet of reductant injector 120. Injector 120 has a reductant injector 120 outlet operatively linked to the inlet of catalytic component 80. Exhaust valve 60, reductant pump 140 and injector 120 are all under the regulation of an exhaust aftertreatment system controller, for example, engine controller 130.

Still referring to FIG. 1, one embodiment is a method of at least partially regenerating at least one component of the exhaust gas aftertreatment system by periodically reducing the flow of exhaust gas to a catalytic component undergoing regeneration and introducing aliquots of reductant into the catalytic component undergoing regeneration. In one embodiment engine controller 130 adjusts exhaust valve 60 to shunt a portion of exhaust from internal combustion engine 5 away from the inlet of catalytic component 80 and to the inlet of exhaust bypass 70 during a single duty cycle. During the same duty cycle, controller 130 energizes reductant pump 140 to deliver reductant (for example, diesel fuel) to the inlet of injector 120. Engine controller 130 regulates injector 120, opening and closing injector 120 as required to deliver aliquots of reductant into catalytic component 80. During the same duty cycle after each injection of reductant, injector 120 may be closed and no additional reductant delivered directly to catalytic component 80 by injector 120. The effect of this sequence produces a series of injections of reductant into the inlet of catalytic component 80 during a given duty cycle.

In one embodiment injector 120 is opened two times during a single regeneration cycle by controller 130. Each time injector 120 is opened during a given duty cycle it is held open for substantially the same period of time, thereby introducing two substantial equal aliquots of reductant into the inlet of catalytic component 80. Injector 120 is closed between injections of aliquots.

In another embodiment injector 120 may be opened a total of three times during a single regeneration cycle by controller 130. Each time injector 120 is opened during a given duty cycle it is held open for substantially the same period of time, thereby introducing three substantial equal aliquots of reductant into the inlet of catalytic component 80. Injector 120 is closed between the injections of aliquots of reductants.

In still another embodiment injector 120 is opened five times during a single regeneration cycle by controller 130. Each time injector 120 is opened during a given duty cycle it is held open for substantially the same period of time, thereby introducing five substantial equal aliquots of reductant into the inlet of catalytic component 80. Injector 120 is closed between the injections of aliquots of reductant.

In one embodiment, exhaust gas valve 60, under the regulation of engine controller 130, shunts at least a portion of exhaust gas produced by internal combustion engine 5 to exhaust gas bypass pipe 70. In one embodiment, exhaust gas bypass pipe 70 outlet is operatively linked to the inlet of catalytic soot filter 100.

In another embodiment reductant introduced via injector 120 under the control of engine regulator 130 is preferentially introduced into catalytic component 80 when at least a portion of exhaust gas produced by internal combustion engine 5 is shunted via exhaust gas valve 60 into exhaust gas bypass pipe 70. The combination of introducing reductant into catalytic component 80 in small increments, while at the same time reducing the volume of exhaust gas being shunted through catalytic component 80 may significantly reduce the fuel penalty associated with regenerating catalytic component 80. The result is a more efficient regeneration of catalytic component 80 and a reduction in the amount of reductant that passes through catalytic component 80 that may be vented to the atmosphere or needlessly oxidized in optional CSF 100.

Referring now to FIG. 2, in another embodiment the exhaust gas aftertreatment system includes a second catalytic component 85. This second catalytic component 85 has a second catalytic component inlet that is operatively linked to the second outlet of exhaust gas valve 60. The second catalytic component 85 also has an exhaust gas outlet which is operatively linked to a crossover pipe 90. Crossover pipe 90 has a first exhaust gas inlet which is operatively linked to the exhaust gas outlet of catalytic component 80. Crossover pipe 90 has a second exhaust gas inlet operatively linked to the outlet of catalytic component 85. Crossover pipe 90 has an exhaust gas outlet which, in one embodiment (not shown) is operatively vented to the atmosphere.

In still another embodiment of the invention shown in FIG. 2, the crossover pipe exhaust gas outlet is operatively linked to the inlet of catalytic soot filter 110. The outlet of catalytic soot filter 100 may be operatively linked to a tailpipe (not shown), while the outlet of the optional tailpipe is vented to the atmosphere.

Referring still to FIG. 2, in one embodiment, exhaust gas valve 60 under the regulation of engine controller 30 shunts at least a portion of exhaust gas produced by internal combustion engine 5 to either catalytic component 80 or catalytic component 85. In one embodiment of the invention, the amount of gas delivered at any given instant to a specific catalytic component (either 80 or 85) is coincident with the need to regenerate either one of the two catalytic components. The input of second catalytic component 85 is operatively linked to the output of a second reductant injector 125. Reductant injector 125 has a reductant injector inlet that is operatively linked to the outlet of reductant pump 140.

In one embodiment, injector 125 delivers a series of substantially equal portions of reductant to second catalytic component 85 as required to at least partially regenerate catalytic component 85. In one embodiment, the total amount of fuel to be injected into second catalytic component 85 during a given regeneration cycle is divided into three substantially equal portions. In still another embodiment, the total amount of fuel to be delivered into catalytic component 85 during a given regeneration cycle is divided into five substantially equal portions of reductant. In still another embodiment, exhaust valve 60 under the regulation of engine controller 130 diverts at least a portion of exhaust gas otherwise directed towards either catalytic component 80 or catalytic component 85, when either component is being regenerated. In one embodiment, the combination of introducing smaller aliquots of reductant and reducing the overall gas flow of exhaust gas to the inlet of each catalytic component 80 or 85 being regenerated, results in a reduced fuel penalty associated with catalytic component regeneration.

Figure 3:
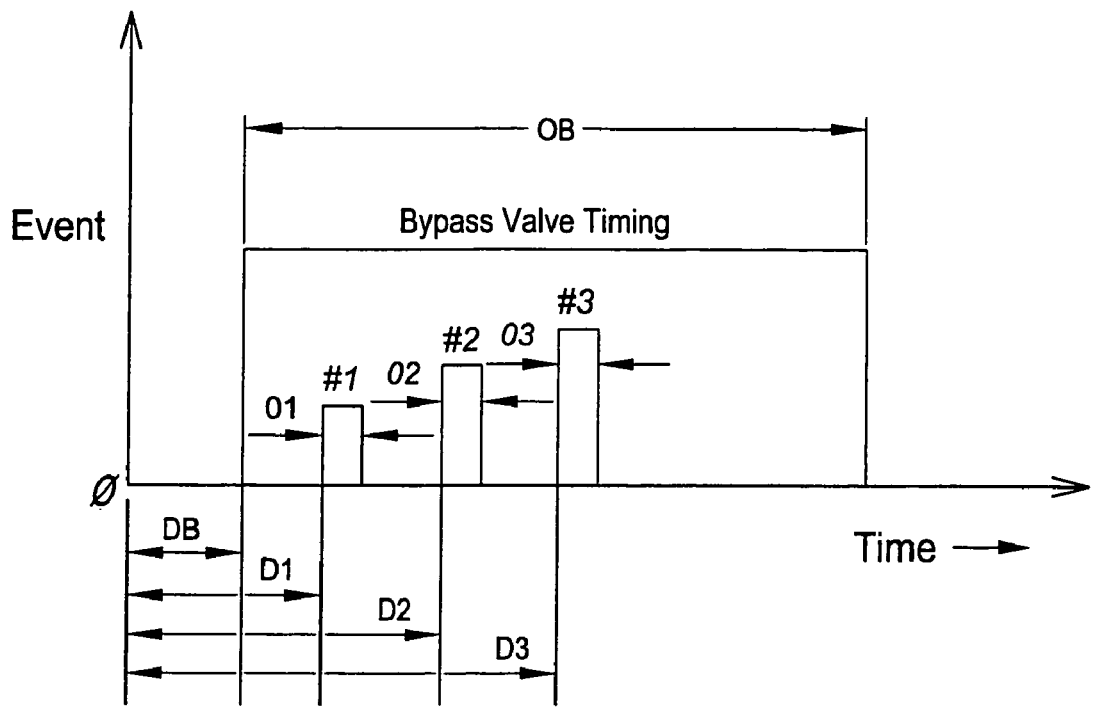
FIG. 3 is a schematic block diagram of a timing sequence used to regenerate components of an internal combustion engine's exhaust gas aftertreatment system.

FIG. 3 is a schematic diagram illustrating the timing of steps involved in one embodiment in introducing reductant into an exhaust gas aftertreatment system. FIG. 3 schematically illustrates some of the steps involved in regenerating at least one catalytic component of an internal combustion engine exhaust gas aftertreatment system. The y-axis of FIG. 3 represents specific Events and the x-axis of represents the Time at which various Events, which appear on the y-axis, are executed. The intersection of the y-axis marked Event and the x-axis marked Time is designated as $\phi$.

Referring again to FIG. 3 and additionally, for illustrative purposes, to FIG. 1. During a regeneration cycle portions of the total amount of reductant introduced into the aftertreatment system during the regeneration cycle are introduced into the aftertreatment system in a series of discrete steps. The time for each injection is denoted as O1, O2, O3 in FIG. 3. When valve 60 is closed, there is a relatively unobstructed exhaust gas flow to catalytic component 80. During the period marked as delay time for bypass valve open (DB) reductant exhaust gas bypass valve 60 is opening. At time designated in FIG. 3 as Open Bypass (OB), exhaust gas flow valve 60 is open. Opening valve 60 shunts at least a portion of the exhaust gas flow away from catalytic component 80, through Bypass Exhaust 70 to the inlet of Catalytic Soot Filter 100. During the period of time designated as OB, reductant is injected into catalytic component 80 during three injection events designated as #1, #2, and #3. Injection events #1, #2, and #3 commence, respectively, at times designated as D1, D2 and D3. The duration of Injection events #1, #2, and #3 are, respectively, O1, O2 and O3. Reductant is injected into the inlet of catalytic component 80 by opening injector 120.

At the end of time sequence DB, at least a portion of internal combustion engine exhaust gas is shunted past the catalytic component of the exhaust gas aftertreatment system undergoing regeneration. In one embodiment illustrated in FIG. 1 this is accomplished by at least partially opening exhaust gas valve 60 to direct at least a portion of engine exhaust generated by engine 5 towards bypass 70 and away from catalytic component 80.

DB equals the delay time for the bypass valve, for example bypass valve 60, to open. OB equals the open duration time for the bypass valve. The open duration time is the amount of time at which at least a portion of exhaust gas produced by engine 5 bypasses the catalytic component undergoing regeneration. D1 equals the delay time for the first injection of reductants into the aftertreatment system as measured from time $\phi$. The length of time that the reductant injector is open is referred to as the Injection duration for injection #1 (O1). D2 equals the delay time from time $\phi$ to the start of injection #2. O2 equals the injection duration for injection #2. D3 equals the delay time from time $\phi$ to the start of a third reductant injection event (injection #3) and O3 equals the injection duration for the third injection of reductant.

Referring now to FIG. 1, injector 120 is activated; that is to say that the reductant output of injector 1 provides reductant to the inlet of catalytic component 80 during times designated in FIG. 3 as O1, O2, and O3. During these periods, reductant via injector 120 is introduced into a catalytic component 80. At all other times shown in FIG. 3, the injector 120 is off, which is to say that injector 120 is not delivering reductant into the intake of catalytic component 80. In one embodiment all of the injections during a specific regeneration cycle take place while engine exhaust gas valve 60 is open to shunt at least some of the exhaust gas produced by engine 5 into exhaust gas bypass pipe 70.

Referring now to FIGS. 3 and 2, as disclosed hereinabove another embodiment the exhaust gas aftertreatment system further includes a second catalytic component designated 85. The second catalytic component 85 has an exhaust gas inlet with is operatively linked to the second exhaust gas outlet of exhaust gas valve 60. The embodiment illustrated in FIG. 2 also has a second injector 125. Second injector 125 has a reductant inlet operatively linked to reductant pump 140 and a reductant outlet operatively linked to the inlet of the second catalytic component 85. Referring now to FIG. 3, in this embodiment the amount of reductant delivered via injector 125 to second catalytic component 85 is again divided into a number into portions. During the time designated DB, exhaust valve 60 shunts at least a portion of the exhaust gas to first catalytic component 80. During times designated O1, O2, and O3 injector 125 delivers a portion of reductant into the inlet of second catalytic component 85. First injector 120 remains inactive.

Events designated as occurring at times marked O1, O2 and O3 and D1, D2, and D3 in FIG. 3 occur when valve 60 is positioned such that it directs most of the exhaust gas away from second catalytic component 85 and towards first catalytic component 80. The combination of introducing portions of the total amount of reductant delivered during a given regeneration cycle and reducing the flow of exhaust to the catalytic components undergoing regeneration results in a significant reduction in the fuel penalty associated with regenerating catalytic component 85. This savings is likely due to more efficient regeneration of catalytic component 85 and in less reductant bypassing second catalytic component 85 and either being vented through the atmosphere or being oxidized by catalytic soot filter 100.

While FIG. 3 illustrates a schematic block diagram of introducing three portions of reductant into an exhaust gas aftertreatment system, a similar strategy can be worked out with the total amount of reductant delivered during a given regeneration cycle divided into virtually any number of portions. For example, a qualitatively similar gain in reductant efficiency and a reduction in a fuel penalty associated with regenerating catalytic components can be readily realized using five distinct injection events (diagram not shown).

Figure 4:
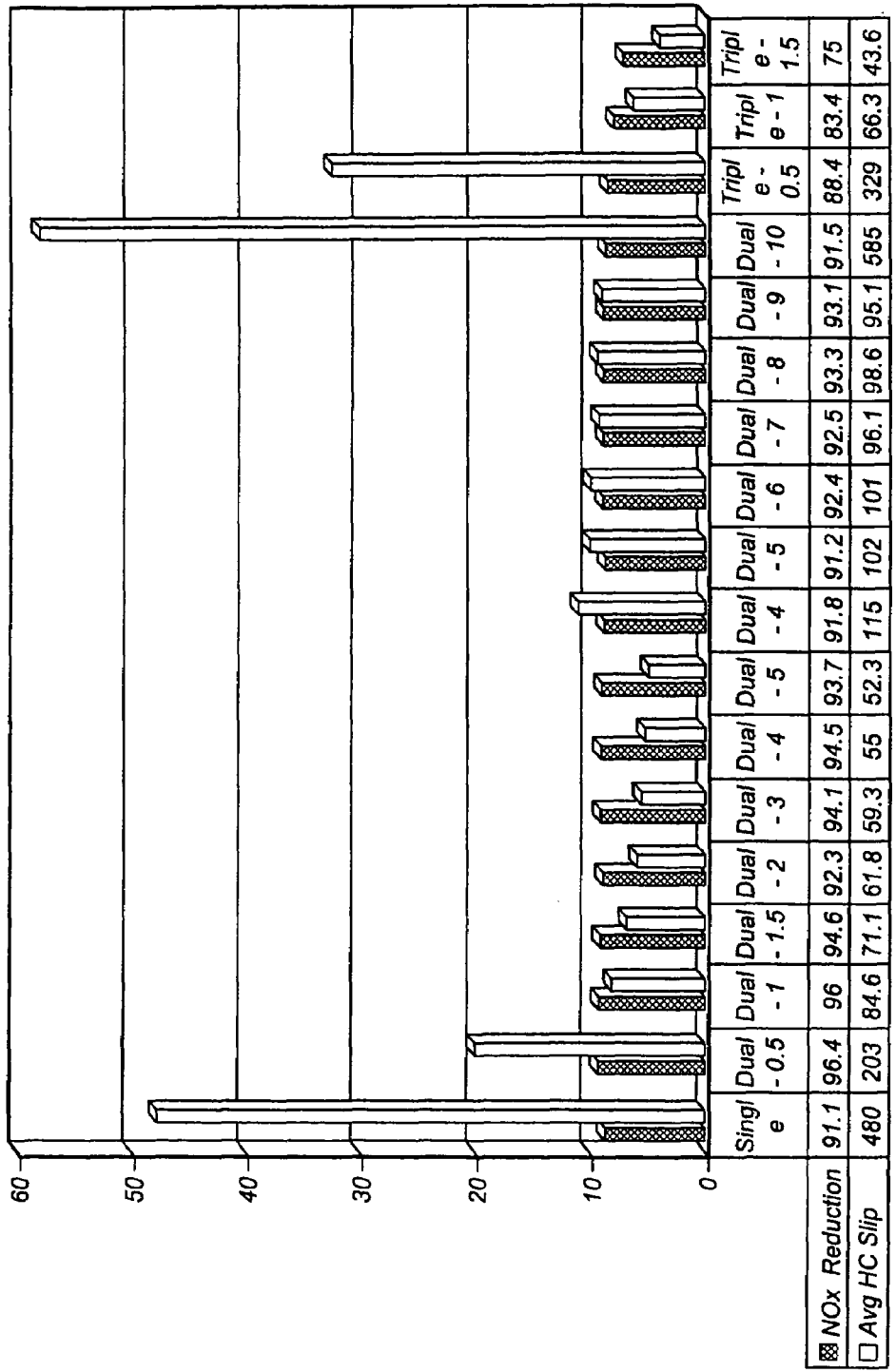
FIG. 4 is graph of data illustrating the effect of reductant injection rate shaping on the conversion of NOx to $N_2$ and the amount of engine fuel escaping from the component undergoing regeneration.

Referring now to FIG. 4. FIG. 4 graphically represents experimental data collected by regenerating a NOx oxide adsorber by introducing portions of reductant into the catalyst. Also illustrated in FIG. 4 is the effect of this method on the amount of reductant (hydrocarbon) lost to the atmosphere. In FIG. 4, the y-axis represents that total amount of NOx, in parts per million, removed from the catalyst and the average amount of hydrocarbon slip also in parts per million. Hydrocarbon slip refers to the amount of hydrocarbon that is measured in the outlet gas of a catalytic component such as a NOx adsorber.

The first pair of data points is from a run in which a given amount of reductant is delivered into the intake of a catalytic component in a single injection. As illustrated by this data point, under these conditions a large amount of hydrocarbon passes un-reacted through the catalyst and there is only a modest reduction in the amount of NOx on the surface of the catalyst. The next seventeen data points illustrate the effects of introducing the same total amount of reductant into the intake of a NOx adsorber during a single regeneration cycle (Rich Duty Cycle) divided into a number of portions. Each portion is introduced into the NOx adsorber by a distinct event, an injection. There is a pause between each injection.

Referring still to FIG. 4, the second data point represents a dual injection with a one-half second delay between the two substantially equal injections. Under these conditions, the amount of NOx reduction is slightly higher than when all of the reductant is introduced in a single injection. And the average amount of hydrocarbon slipping past the catalytic component is significantly reduced relative to the single injection run. The data represented in the third data point is taken from a run in which there was a one-second delay between two substantially equal injections of reductant into the catalytic component. The amount of NOx reduced is larger in this run than in either of the first two runs. The average amount of hydrocarbon slipping past the catalyst is significantly lower in this run than in either the single or dual injection runs.

As illustrated in FIG. 4, a five-second delay between two injections of substantially equal portions of reductant into a catalytic component results in an NOx reduction of about 93.7 parts per million and the lowest average hydrocarbon slip measured in the dual injection tests, which is on the order of 52.3 parts per million.

Referring now to the last three data sets represented in FIG. 4, these data points represent the effect of introducing three substantially equal injections of a reductant into a catalytic component such as 80 or 85 (FIGS. 2, 3). As illustrated by the data summarized in FIG. 4, when three injections of reductant are separated by 0.5 seconds the total amount of NOx reduction is 88.4 parts per million. This amount of NOx reduction is less than the amount measured when the same total amount of reductant was introduced into the component in a single step. The average slip is reduced by a modest amount relative to the single injection from 480 parts per million of hydrocarbon slip measured with a single injection to 329 measured with a triple injection wherein each separate injection is separated by 0.5 seconds from the previous.

The experiment was repeated with three injections of substantially equal portions of reductant with the injections spaced 1 second apart. Under these conditions, the amount of NOx reduced dropped to 83.4% but the average amount of hydrocarbon slip dropped to 66.3%. These values compare favorably with the amounts of NOx reduced and hydrocarbon slip measured when the same amount of reductant was introduced in the single or dual injection event. The last pair of data points in the table represent the effect of introducing three substantially equal portions of reductant into an NOx adsorber as shown in FIG. 1 or 2 as components 80 or 85. Under these conditions, the NOx reduction was 75 parts per million and the average hydrocarbon slip was 43.6 parts per million. This particular run exhibited the highest amount of NOx reduction and the lowest amount of hydrocarbon slip of all the tests shown in FIG. 4. Clearly, by dividing the total amount of reductant used to regenerated catalytic components of the system into smaller portions and then introducing these portions incrementally an increase in the fuel efficiency of catalytic component regeneration is achieved.

In one embodiment of the invention, engine controller 130, based on predetermined time settings, engine run parameters, measured levels of NOx or any combination of these criteria, regulates exhaust gas flow through the exhaust system and controls the injection of fuel into the exhaust stream.

The valve 60 may comprise either variable flow rate control valves or may comprise valves having a fixed number of flow rate settings. For example, if the aftertreatment system design dictates that the relative flow between NOx adsorber 80 and bypass 70 or NOx adsorbers 80, 85 will always be 20-80 during regeneration, then the valve 60 may have discrete settings that will allow the engine controller 130 to switch them between reduced flow (20%) and max flow (80%) settings in order to achieve the desired flow reduction in one leg. Optionally, the valve 60 may have variably adjustable flow rates, such that the engine controller 130 can infinitely adjust the flow percentage through each valve outlet in order to divide the exhaust flow between the legs in any desired proportion.

The engine controller 130 receives data indicative of engine performance, and exhaust gas composition including but not limited to engine sensor data, such as engine position sensor data, speed sensor data, air mass flow sensor 10 data, fuel rate data, pressure sensor P data, temperature sensor T data, NOx sensor N, etc., as is known in the art. The engine controller 130 may further provide data to the engine in order to control the operating state of the engine, and components of the aftertreatment system, as is well known in the art.

Because the exhaust flow is reduced in the adsorber leg being regenerated, the amount of reductant required to create a rich (stoichiometric) exhaust gas is reduced. The concentration of reductant required for reduction remains the same, but this amount is a small fraction of the total reductant that would be required during full exhaust flow. It will be appreciated that any flow ratios may be utilized during reduction and regeneration and during normal flow, even though exemplary flows are used herein for illustrative purposes. The optimum flow ratios for any given system will depend upon the particular system configuration.

As detailed hereinabove for a parallel dual adsorber system, the adsorber regeneration cycle switches back and forth between the two sides of the exhaust as necessary in order to keep the outlet exhaust stream purified of excessive emissions. It will be appreciated that since dual exhaust streams are utilized, the regeneration cycle of the NOx adsorber does not necessarily have to be short. During the entire time that one adsorber is being regenerated, the other adsorber is available for treating the majority of the exhaust gas stream. It should also be noted, that the temperature of the aftertreatment components may be controlled by adjustment of the valve 60. By allowing slightly more exhaust gas to pass into the regeneration side of the exhaust, the temperature thereof may be raised.

One advantage of the full bypass system is that since the exhaust flow is reduced in the leg undergoing NOx adsorber regeneration, only a fraction of the amount of hydrocarbon that would have been required to make the mixture rich during full flow is now required. The result is a substantial reduction in the fuel penalty incurred for regeneration of the NOx adsorber catalyst. Once a leg has been regenerated, the flow distribution between the parallel legs may be reversed, and the other catalyst leg regenerated while the newly regenerated leg receives the majority of the exhaust flow. Another advantage of the present invention is that since NOx is being stored in one leg while the other leg is being regenerated, the regeneration operation can be performed for a longer period of time, resulting in greater regeneration efficiency.

In one preferred embodiment of the invention, fuel is injected into the exhaust gas when the engine duty cycle is such that relatively little exhaust gas is being produced by the engine. This enables the exhaust to be enriched in fuel while incurring a relatively low fuel penalty as the volume of exhaust gas is relatively reduced.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. And while the invention was illustrated using specific examples, and premised on certain theoretical or idealized accounts of catalysis behavior, these illustrations and the accompanying discussion should by no means be interpreted as limiting the invention. An Abstract of the Disclosure is provided as an aid to searchers and it is not intended to serve as a summary of the invention and it is not to be used to interpret the meaning of the claims, figures specification or any other portion of this document.

We claim:

1. A method of regenerating catalytic components of an internal combustion engine exhaust gas aftertreatment system comprising the steps of:
    providing reductant to regenerate catalytic components of said aftertreatment system;
    dividing said reductant into at least two portions; and
    introducing said portions of reductant directly into said exhaust gas aftertreatment system, wherein there is about 0.5 to about 10.0 seconds between the times at which each of said portions are introduced into said catalytic component;
    the method further including the step of providing;
    an exhaust gas aftertreatment system comprising:
    an exhaust gas aftertreatment system controller;
    an internal combustion engine exhaust gas outlet;
    an exhaust gas flow valve system inlet, having an exhaust gas flow valve system first outlet, and an exhaust gas flow valve system second outlet;
        an exhaust gas bypass, having an exhaust gas bypass inlet; and
        an exhaust gas bypass outlet,
    a catalytic component having a catalytic component inlet and a catalytic component outlet; wherein said exhaust gas exhaust gas flow valve system inlet is operatively linked to said internal combustion engine exhaust, said exhaust gas flow valve system first outlet is operatively linked to said catalytic component exhaust gas inlet, said exhaust gas flow valve system second outlet is operatively linked to said exhaust gas bypass inlet, and said flow valve system is regulated by said exhaust gas aftertreatment system controller.

2. The method of regenerating catalytic components of an internal combustion engine exhaust gas aftertreatment system according to claim 1, wherein said exhaust gas aftertreatment system further includes:
    a reductant delivery system, comprising;
    a reductant reservoir having at least one reductant reservoir outlet;
    a reductant pump having a reductant pump inlet and a reductant pump outlet;
    a reductant injector having a reductant injector inlet and
    a reductant injector outlet, wherein said reductant pump inlet is operatively coupled to at least one of said reductant reservoir outlets, said reductant pump outlet is operatively coupled to said injector inlet and said reductant injector inlet and said reductant injector outlet is operatively coupled to said catalytic component inlet.

3. The method of regenerating catalytic components of an internal combustion engine exhaust gas aftertreatment system according to claim 2, wherein said exhaust gas flow valve system shunts at least a portion of said exhaust gas away from said catalytic component and towards said exhaust gas bypass when said reductant is being introduced into said catalytic components.

4. The method of regenerating catalytic components of an internal combustion engine exhaust gas aftertreatment system according to claim 3, wherein said exhaust gas flow valve system is a variable 3-way valve.

5. The method of regenerating catalytic components of an internal combustion engine exhaust gas aftertreatment system according to claim 3, wherein said exhaust gas flow valve system is a fixed proportional 3-way valve.

6. The method of regenerating catalytic components of an internal combustion engine exhaust gas aftertreatment system according to claim 3, wherein said exhaust gas flow valve system is a variable pair of 2-way valves.

7. The method of regenerating catalytic components of an internal combustion engine exhaust gas aftertreatment system according to claim 1, wherein said exhaust gas aftertreatment system further includes:

a second catalytic component, having a second catalytic component exhaust gas inlet, and a second catalytic component exhaust gas outlet, wherein said second catalytic component exhaust gas inlet is operatively linked to said exhaust gas bypass outlet.

8. The method of regenerating catalytic components of an internal combustion engine exhaust gas aftertreatment system according to claim 1, wherein said exhaust gas aftertreatment system controller is an engine controller.

9. The method of regenerating catalytic components of an internal combustion engine exhaust gas aftertreatment system according to claim 7, wherein said exhaust gas aftertreatment system further includes:

a cross over pipe having a crossover pipe first exhaust gas inlet, a crossover pipe second exhaust gas inlet, and a crossover pipe exhaust gas outlet wherein said first catalytic component exhaust gas outlet is operatively linked to said crossover pipe first exhaust gas inlet, said second catalytic component exhaust gas outlet is operatively linked to said crossover pipe second exhaust gas inlet, and said crossover pipe exhaust gas outlet is vented to the atmosphere.

10. The method of regenerating catalytic components of an internal combustion engine exhaust gas aftertreatment system according to claim 1, wherein said exhaust gas aftertreatment system further includes:

a catalytic soot filter having a catalytic soot filter exhaust gas inlet and a catalytic soot filter exhaust gas outlet, wherein said a catalytic soot filter exhaust gas inlet is operatively linked to said crossover pipe exhaust gas outlet, and a catalytic soot filter exhaust gas outlet is vented to the atmosphere.

11. The method of claim 1, wherein said reductant is divided into three portions.

12. The method of claim 1, wherein said reductant is divided into four portions.

13. The method of claim 1, further comprising reducing the flow of exhaust gas to at least one of said catalytic components when said reductant is introduced into said catalytic components.

* * * * *